Aug. 28, 1934.  L. J. ROSA ET AL  1,971,877
HUB SHELL CONSTRUCTION FOR VEHICLE WHEELS
Filed July 27, 1931  2 Sheets-Sheet 2
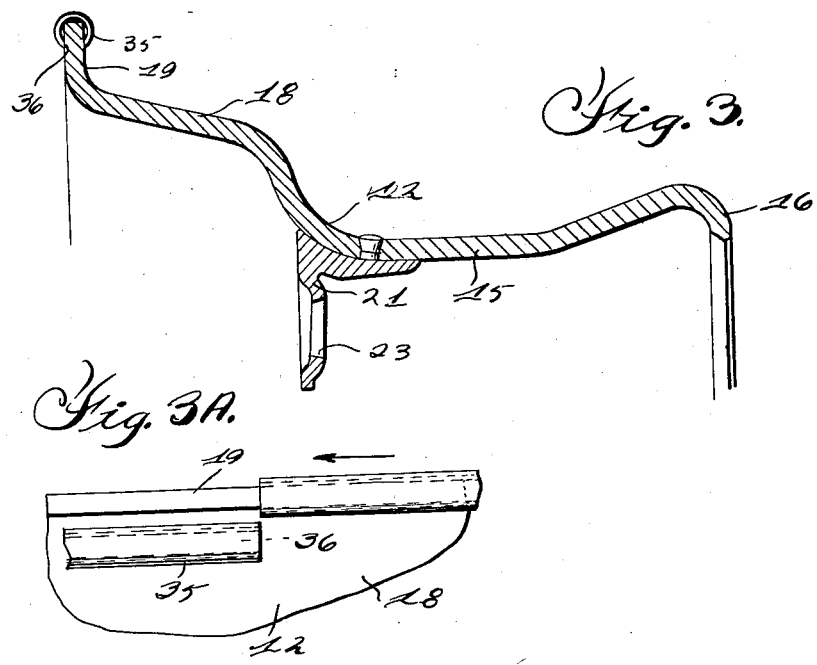

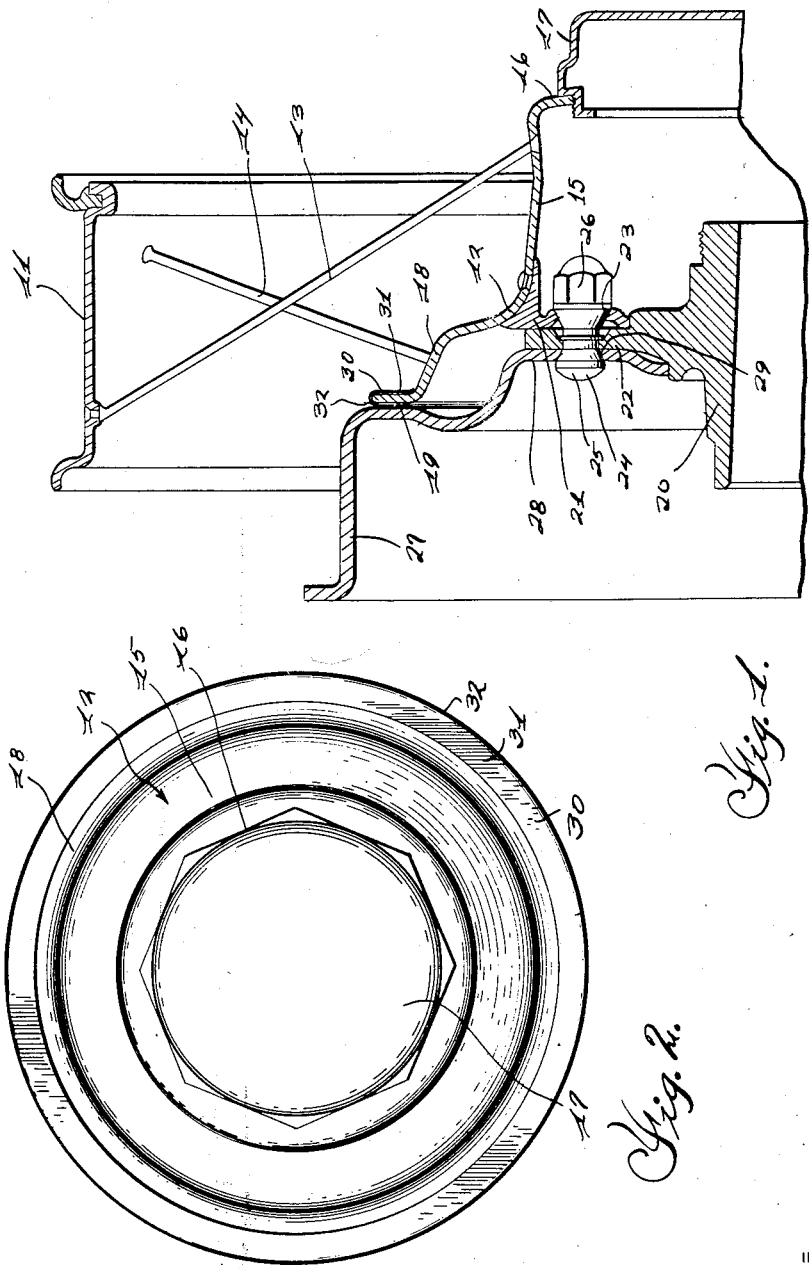

Patented Aug. 28, 1934

1,971,877

UNITED STATES PATENT OFFICE 1,971,877

HUB SHELL CONSTRUCTION FOR VEHICLE WHEELS

Leonard J. Rosa, Detroit, and Charles S. Ash, Birmingham, Mich., assignors to Kelsey-Hayes Wheel Corporation, Detroit, Mich., a corporation of New York Application July 27, 1931, Serial No. 553,430

5 Claims. (Cl. 41—10)

This invention relates generally to vehicle wheels and has particular reference to improvements in hub shells for vehicle wire wheels.

One of the principal objects of this invention is to enhance the general appearance of vehicle wheels without appreciably effecting the present cost of manufacture or weight thereof.

This invention contemplates securing the foregoing advantageous feature by providing the hub shell of the wheel with ornamental means which may be in the form of a ring visible from the front side of the wheel and having a finish distinguishable from the finish of the hub shell so as to provide some relief to the appearance of the latter.

The foregoing as well as other objects will be made more apparent as this description proceeds, especially when considered in connection with the accompanying drawings, wherein:

Figure 1 is a fragmentary cross-sectional view through a vehicle wheel equipped with a hub shell having an ornamental ring applied thereto in accordance with this invention;

Figure 2 is a front elevational view of the hub shell shown in Figure 1;

Figure 3 is a cross-sectional view through a hub shell showing a slightly modified form of finish ring;

Figure 3A is a fragmentary elevational view illustrating the manner in which the ring shown in Figure 3 may be assembled with the shell.

For the purpose of illustrating the various embodiments of the invention featured herein we have selected a vehicle wire wheel of the type wherein the attaching means for demountably securing the wheel in place is arranged within the hub shell and concealed thereby. In detail, the vehicle wheel shown in Figure 1 comprises a rim 11 and a hub shell 12 arranged within the rim in concentric relation therewith and operatively connected thereto by means of the front and rear spokes 13 and 14, respectively. The inner ends of the spokes 13 and 14 are riveted or otherwise suitably secured to the hub shell 12, while the outer ends of the spokes are anchored in the base of the rim 11. The shell 12 is preferably formed with a barrel portion 15 terminating at the front end thereof in an inwardly flared flange 16 fashioned to detachably receive a suitable hub cap 17. The rear end of the barrel portion 15 is flared outwardly as at 18 and terminates in a radially outwardly extending flange 19.

In order to provide for detachably attaching the shell to the inner hub of a wheel designated generally herein by the reference character 20, we provide attaching portions 21 permanently secured to the shell intermediate the front and rear ends thereof and extending radially inwardly therefrom. The attaching portions 21 are adapted to embrace the front side of the radial fixed flange 22 of the inner hub and are provided at circumferentially spaced points with apertures 23 arranged in registration with corresponding openings in the fixed flange for receiving the fastening elements 24. In the present instance, the fastening means 24 comprises bolts 25 having head portions permanently anchored in the fixed flange and having threaded shank portions extending through the apertures 23 for detachably receiving the clamping nuts 26 which serve to detachably clamp the attaching portions 21 of the shell to the fixed flange. The above arrangement is such that the demountable fastening means including the attaching portions 21 on the shell are thoroughly concealed from view when the hub cap 17 is in assembled relation with the shell and at the same time are readily accessible by merely removing the hub cap.

The fastening means, in addition to detachably securing the shell to the front side of the fixed flange, also functions to permanently secure the brake drum of the wheel to the rear face of the fixed flange. The brake drum is illustrated herein by the reference character 27 and comprises a web portion 28 centrally apertured to receive the rear portion of the inner hub and having openings 29 therein registering with the openings in the fixed flange and attaching portions 21 of the shell for receiving the head portions of the bolts 25 which are in effect riveted over the web to provide a permanent connection between the brake drum and inner hub.

As previously stated, it is the principal object of this invention to enhance the general appearance of the wheel by providing some relief to the more or less uniform surface presented by the hub shell. This is accomplished by securing an annular ring 30 to the radially outwardly extending rear flange 19 of the shell. The ring 30 is preferably formed of metal and may be fashioned by a stamping or rolling operation and preferably presents an appearance readily distinguishable from the exterior surface of the hub shell. In order to secure the desired appearance, the ring 30 may be chrome plated or formed of some relatively bright metal such, for example, as stainless steel or duralumin.

In any event, the ring 30 is formed with a body portion 31 adapted to embrace the front side of the radially outwardly extending flange 19 on the hub shell and terminating at the outer end thereof in a rearwardly curved portion 32 adapted to extend over the peripheral surface of the flange 19 to conceal the same and to provide for securing the ring to the shell. In this connection, it is to be noted that in the event it is desired to provide additional securing means for the ring, the same may be welded, riveted or otherwise permanently fixed to the flange 19. It has been found, however, that merely bending the outer portion of the ring over the peripheral edge of the flange 19 as shown in Figure 1 is sufficient to adequately secure the ring in place.

In Figure 3 we have shown a slightly modified form of appearance ring which differs from the one previously described in that it simulates in effect a circular bead on the outer edge of the hub shell flange 19. The aforesaid ring is designated in Figure 3 by the reference character 35 and as shown in this latter figure is substantially tubular in cross-sectional area having in effect an annular slot 36 in the inner surface thereof of sufficient width to permit the peripheral portions of the flange 19 to be extended into the tubular ring as clearly illustrated in Figure 3. The ring 35 may be prefashioned by a rolling or other suitable operation and may be either transversely split so as to permit the same to be in effect threaded upon the flange 19 as shown in Figure 3A or formed continuous and rolled in place upon the flange 19.

While in describing the two embodiments of the invention particular stress has been placed upon the association of the same with a specific type of vehicle wheel, it should be understood that the latter is shown herein for the purpose of illustration only, and that the aforesaid embodiments of the invention are capable for use upon wheels of various other types and designs. It should further be understood that while only two embodiments of the invention have been described herein in detail, no attempt has been made to illustrate and describe all of the possible modifications of this invention and accordingly, reservation is made to make such changes in the several constructions as may come within the purview of the accompanying claims.

What we claim as our invention is:

1. A vehicle wheel having a hub shell provided with a radially outwardly extending flange at the rear end thereof, and a ring substantially tubular in cross section encircling said flange and concealing the peripheral portions of the same.

2. A vehicle wheel having a hub shell provided with a radially extending portion, and an appearance ring having a portion located at the front side of the flange and having another portion extending over the periphery of the flange, said ring being transversely split to provide for assembling the same with the flange.

3. A vehicle wheel having a hub shell provided with a radially extending flange, an appearance ring substantially tubular in cross section and having a circumferentially extending slot in the inner surface thereof fashioned to receive the peripheral portions of said flange.

4. A vehicle wheel having a hub shell provided with a radially extending flange, an appearance ring substantially tubular in cross section and having a circumferentially extending slot in the inner surface thereof fashioned to receive the peripheral portions of said flange, said ring being transversely split to provide for assembling the same with said flange.

5. A vehicle wheel having a hub shell provided with a radially extending flange at one end thereof, and an appearance ring having a portion located at the front side of the flange aforesaid, and having another portion curled over the periphery of said flange and engageable with the opposite side of the same to cooperate with said first named portion in holding the ring in assembled relation with the shell.

LEONARD J. ROSA.
CHARLES S. ASH.